United States Patent [19]

Miyajima

[11] Patent Number: 5,379,283
[45] Date of Patent: Jan. 3, 1995

[54] MAGNETO-OPTICAL RECORDING/REPRODUCING METHOD WITH OPTICAL HEAD SERVO INHIBITED DURING MAGNETIC HEAD LOADING

[75] Inventor: Yoshikazu Miyajima, Kawasaki, Japan

[73] Assignee: Canon Kabushiki Kaisha, Tokyo, Japan

[21] Appl. No.: 207,211

[22] Filed: Mar. 8, 1994

[30] Foreign Application Priority Data

Mar. 15, 1993 [JP]  Japan .................................. 5-078638

[51] Int. Cl.⁶ .............................................. G11B 7/095
[52] U.S. Cl. ..................................... 369/44.29; 369/54
[58] Field of Search ............. 369/13, 32, 44.28, 44.29, 369/44.31, 44.32, 44.35, 54, 58; 360/70, 77.02, 105, 114

[56] References Cited

U.S. PATENT DOCUMENTS 5,128,911  7/1992  Ito et al. ...................... 369/44.35 X
5,199,016  3/1993  Shikichi ....................... 369/44.29 X Primary Examiner—W. R. Young
Attorney, Agent, or Firm—Fitzpatrick, Cella, Harper & Scinto

[57] ABSTRACT

In a magneto-optical recording/reproducing method, recording of information is effected on a magneto-optical recording disk by irradiating the magneto-optical disk with a laser beam from an optical head while applying a magnetic field modulated according to information from a flying magnetic head. A servo control to the optical head such as focusing servo control, tracking servo control or the like is prohibited during loading the flying magnetic head onto a disk surface. According to the magneto-optical recording/reproducing method, servo control failure due to some disturbances upon loading the flying magnetic head to the disk can be prevented.

3 Claims, 8 Drawing Sheets

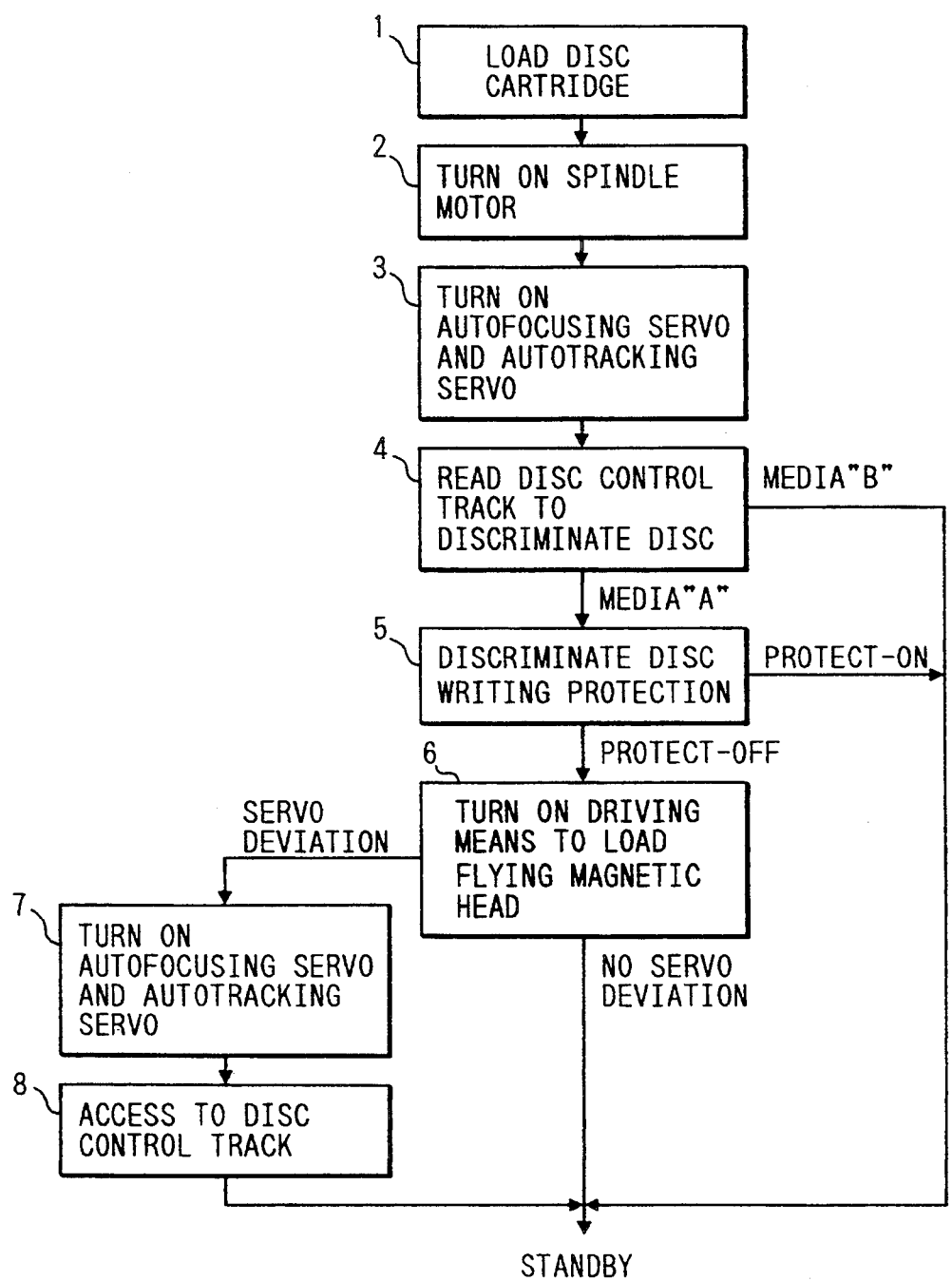

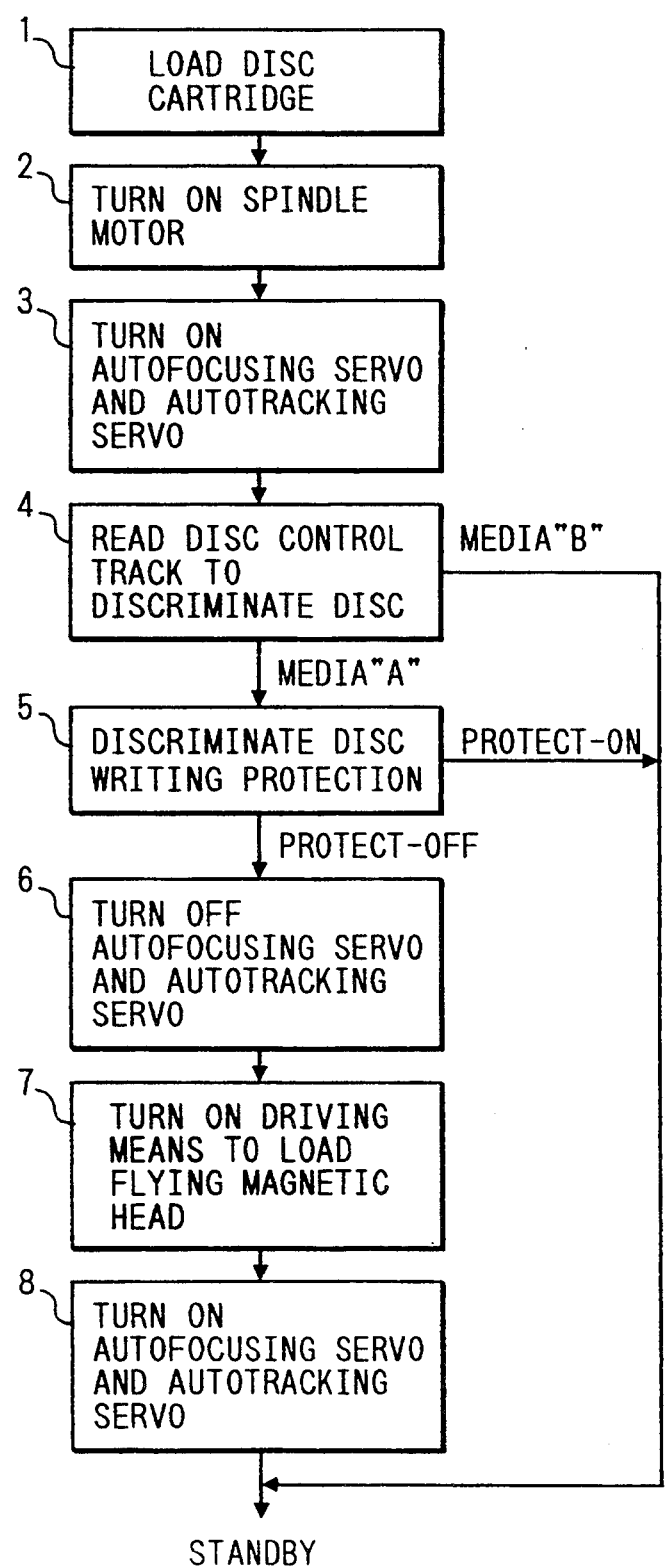

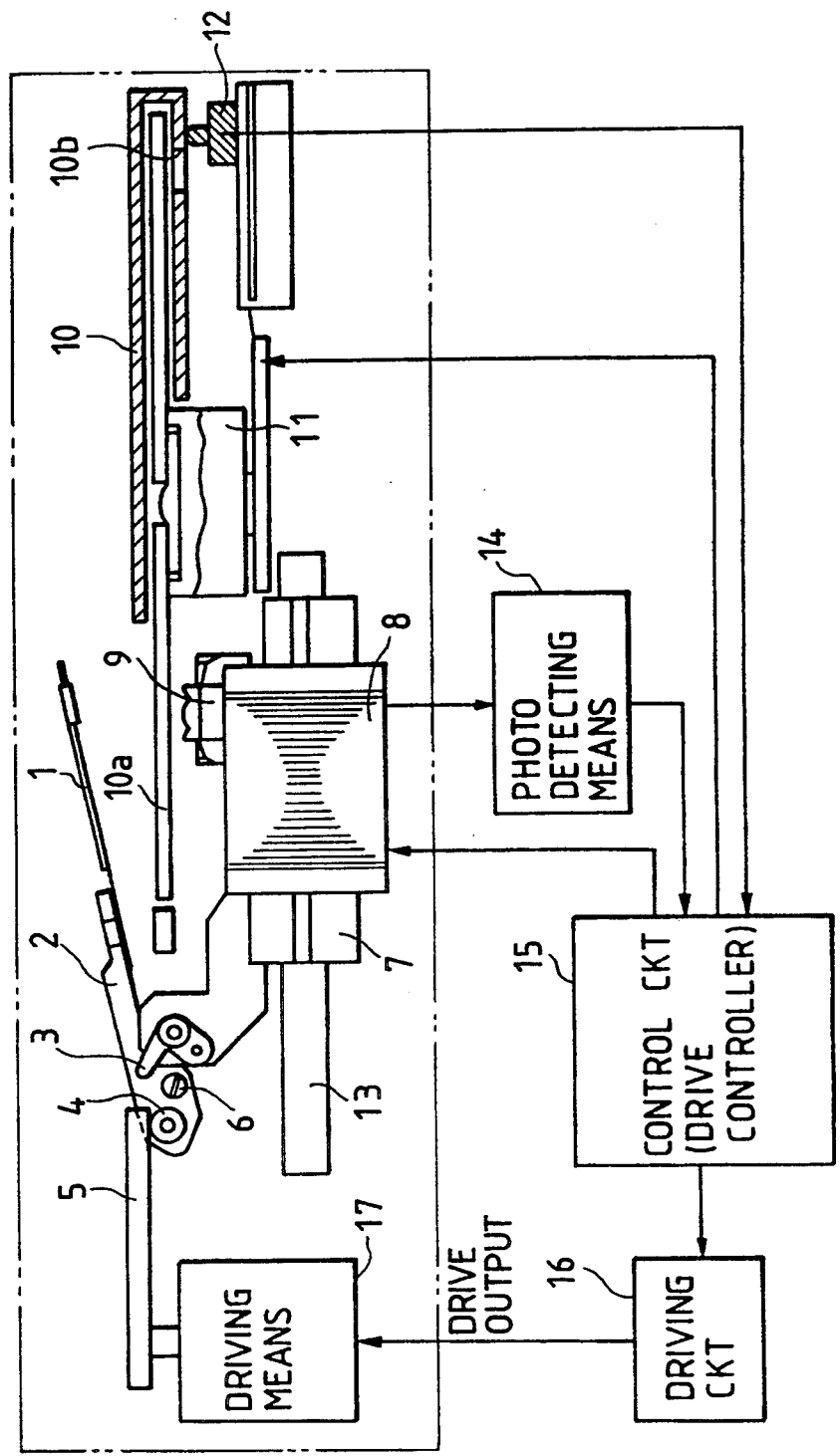

MAGNETO-OPTICAL RECORDING/REPRODUCING METHOD WITH OPTICAL HEAD SERVO INHIBITED DURING MAGNETIC HEAD LOADING

BACKGROUND OF THE INVENTION

1. Field of the Invention

The present invention relates to a magneto-optical recording/reproducing method for recording and/or reproducing information by applying a magnetic field modulated according to information from a magnetic head while radiating a laser beam onto a disk-shaped magneto-optical recording medium.

2. Related Background Art

A conventional drive apparatus for executing a magneto-optical recording/reproducing method has an arrangement, as shown in FIGS. 1A and 1B. The drive apparatus shown in FIGS. 1A and 1B comprises a flying magnetic head 101 for applying a modulated magnetic field, a holding member 102 for holding the flying magnetic head, a positioning member 103 for regulating the loading position of the flying magnetic head to a magneto-optical disk, a bearing 104 for holding the flying magnetic head 101 in an unload state, and allowing a seek operation of the holding member 102, a guide shaft 105 for guiding the bearing in the seek direction, a stopper 106 for positioning the holding member 102 by abutting it against the positioning member 103, an optical head 107 for radiating and receiving a laser beam to and from a magneto-optical disk so as to record/reproduce information, a linear motor coil 108 for performing a seek operation of the optical head 107 in the radial direction of the disk, an actuator 109 for focusing a laser beam radiated from the optical head 107 on the recording surface of the recording medium, and moving the laser beam in the tracking direction, and a disk cartridge 110 for protecting and storing the recording medium (a disk 110a in FIGS. 1A and 1B).

A write protect switch 110b which slides in a groove is provided to the cartridge. The apparatus also comprises a spindle motor 111 for rotating the magneto-optical disk 110a, a write protect detection means 112 for mechanically detecting the position of the groove of the write protect switch 110b provided to the disk cartridge 110, a guide rail 113 for guiding the optical head in the seek direction, an optical detection means 114 for receiving and photoelectrically converting an information signal based on a laser beam from the optical head 107, and a control circuit 115 for controlling a drive circuit 116. The drive circuit 116 drives a drive means 117 on the basis of signals from the optical detection means 114 and the write protect switch 112 so as to drive the linear motor 108 and the actuator 109 and to move the guide shaft 105 vertically.

In the prior art, as shown in FIG. 2, the disk cartridge 110 is loaded, the spindle motor 111 is started, auto-focus servo control and auto-tracking servo control of the magneto-optical disk 110a are performed by the actuator 109 mounted on the optical head 107, and the control track of the magneto-optical disk 110a is read to discriminate whether the magneto-optical disk is the following disk A or B:

Disk A: magnetic field modulation magneto-optical disk;

Disk B: optical modulation magneto-optical disk.

When it is determined that the disk 110a is the disk B, the flying magnetic head 101 is not loaded, and a standby state is set. On the other hand, when it is determined that the disk 110a is the disk A, a disk write protect mode is further checked. If the write protect mode is ON, the flying magnetic head 101 is not loaded, and a standby state is set. However, if the write protect mode is OFF, the drive means 117 is enabled to load the flying magnetic head 101.

In the prior art, since the flying magnetic head 101 is loaded under the auto-focus servo control and auto-tracking servo control, when the state shown in FIG. 1A is switched to the state shown in FIG. 1B, i.e., when the flying magnetic head 101 is loaded with respect to the disk 110a, it may often give a disturbance, and the servo control may fail. When the servo control fails, a laser beam from the optical head 107 is radiated on a track considerably separated from a control track (standby position) for a target track, and the target control track (standby position) must be accessed again. When the servo control completely fails (when both the auto-focus servo control and auto-tracking servo control fail), auto-focus servo control and auto-tracking servo control must be performed again, and the control track as the target track must be accessed. Since a large disturbance is input to a servo control system, an excessive current is temporarily supplied to the actuator 109.

SUMMARY OF THE INVENTION

The present invention has been made in consideration of the above situation, and has as its object to provide a magneto-optical recording/reproducing method which can prevent servo control failure due to a disturbance upon loading a flying magnetic head with respect to a magneto-optical disk.

In order to achieve the above object, there is provided a magneto-optical recording/reproducing method for recording information on a magneto-optical disk by radiating a laser beam from an optical head onto the magneto-optical disk, and applying a magnetic field modulated according to information from a flying magnetic head, comprising the steps of: loading the flying magnetic head onto the disk surface; and inhibiting servo control of the optical head during execution of the loading step.

BRIEF DESCRIPTION OF THE DRAWINGS

FIG. 2 is a flow chart showing the control sequence of the apparatus shown in FIGS. 1A and 1B;

FIG. 3 is a flow chart showing a magneto-optical recording/reproducing method according to the present invention; and FIGS. 4 to 7 are views showing the operation states of a magneto-optical disk drive apparatus upon execution of the magneto-optical recording/reproducing method of the present invention.

DETAILED DESCRIPTION OF THE PREFERRED EMBODIMENT

Figure 1A:
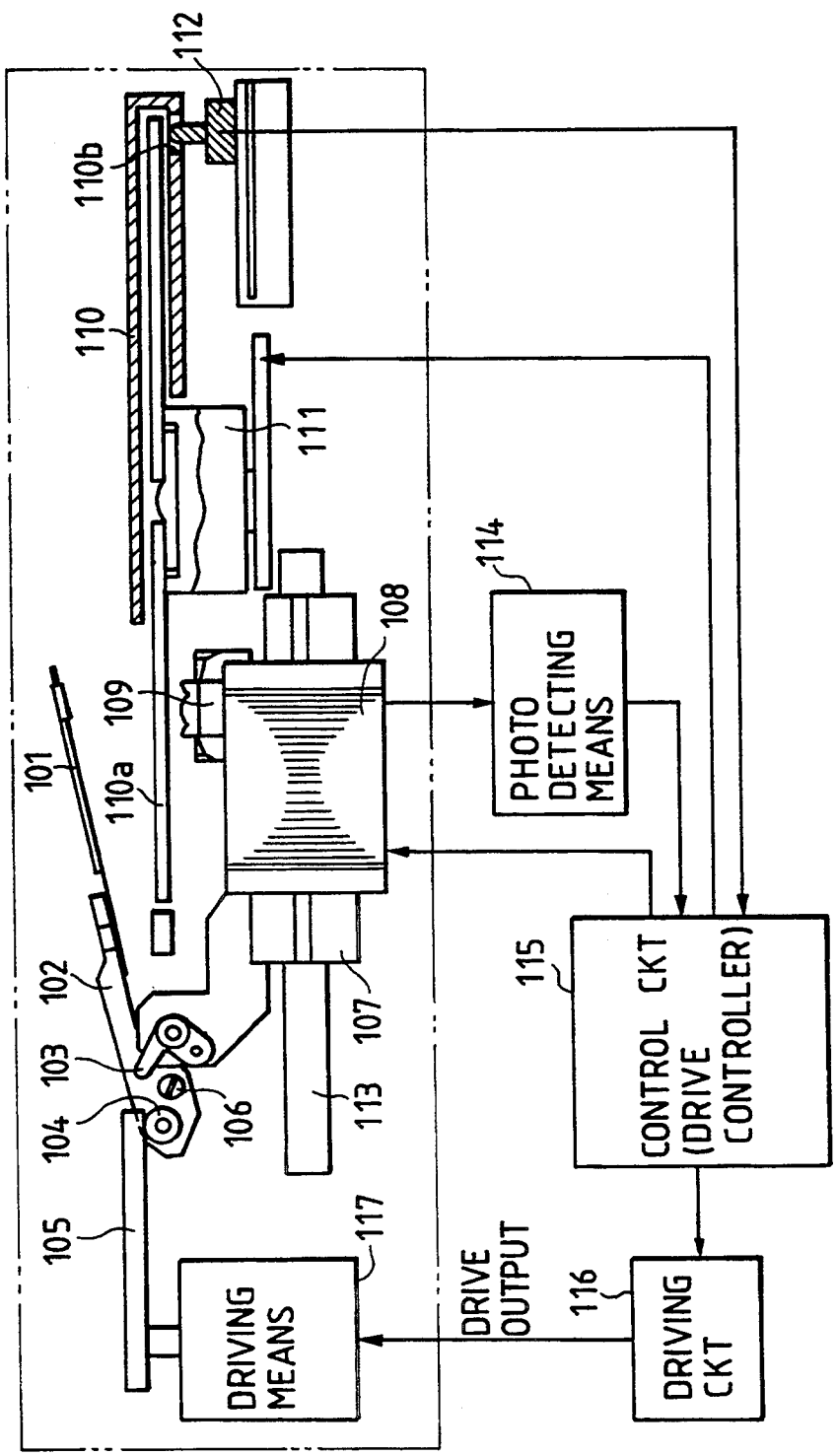
FIGS. 1A and 1B are views showing the operation states of a conventional magneto-optical disk drive apparatus.
Figure 1B:
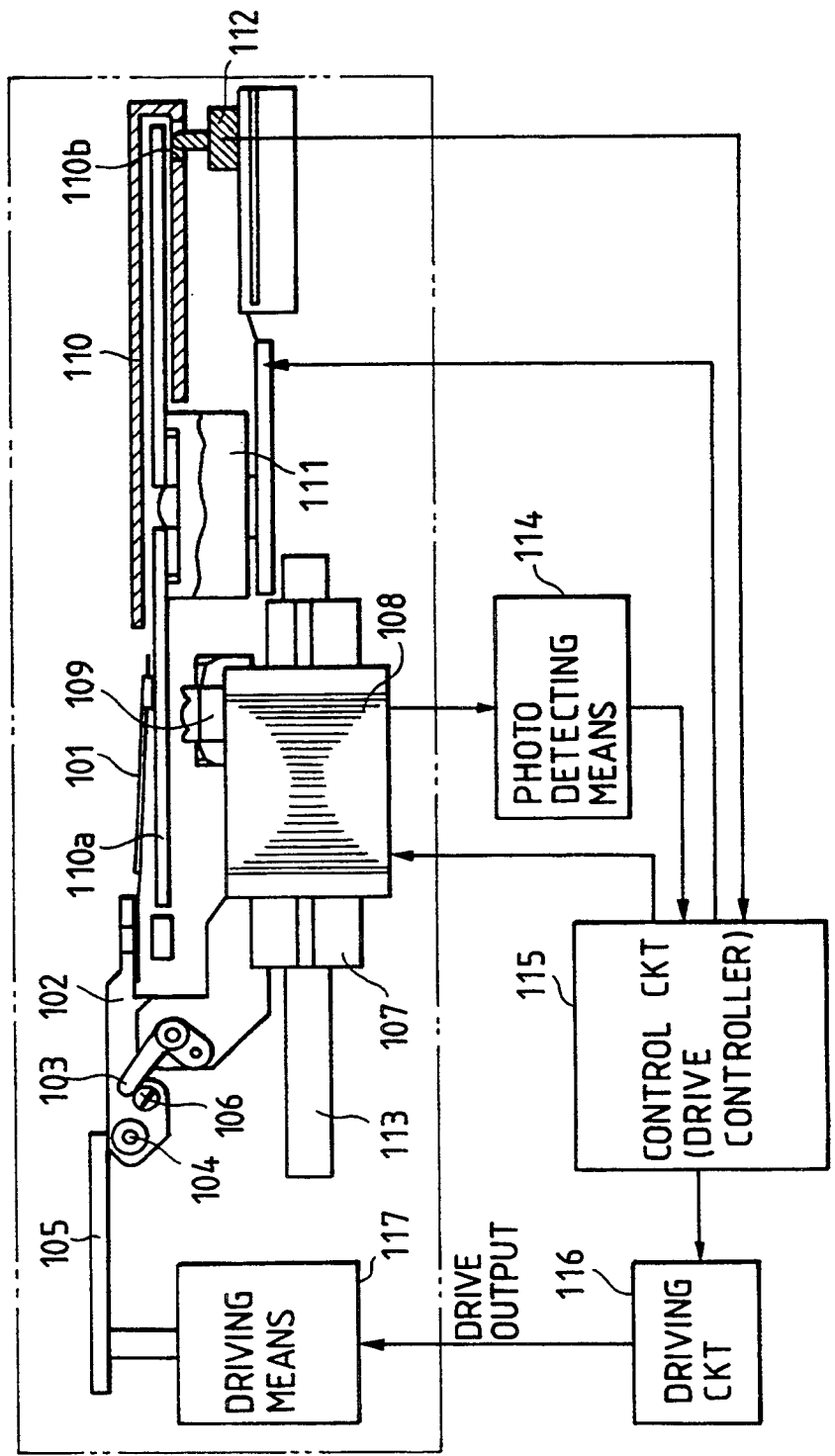
Figure 4:
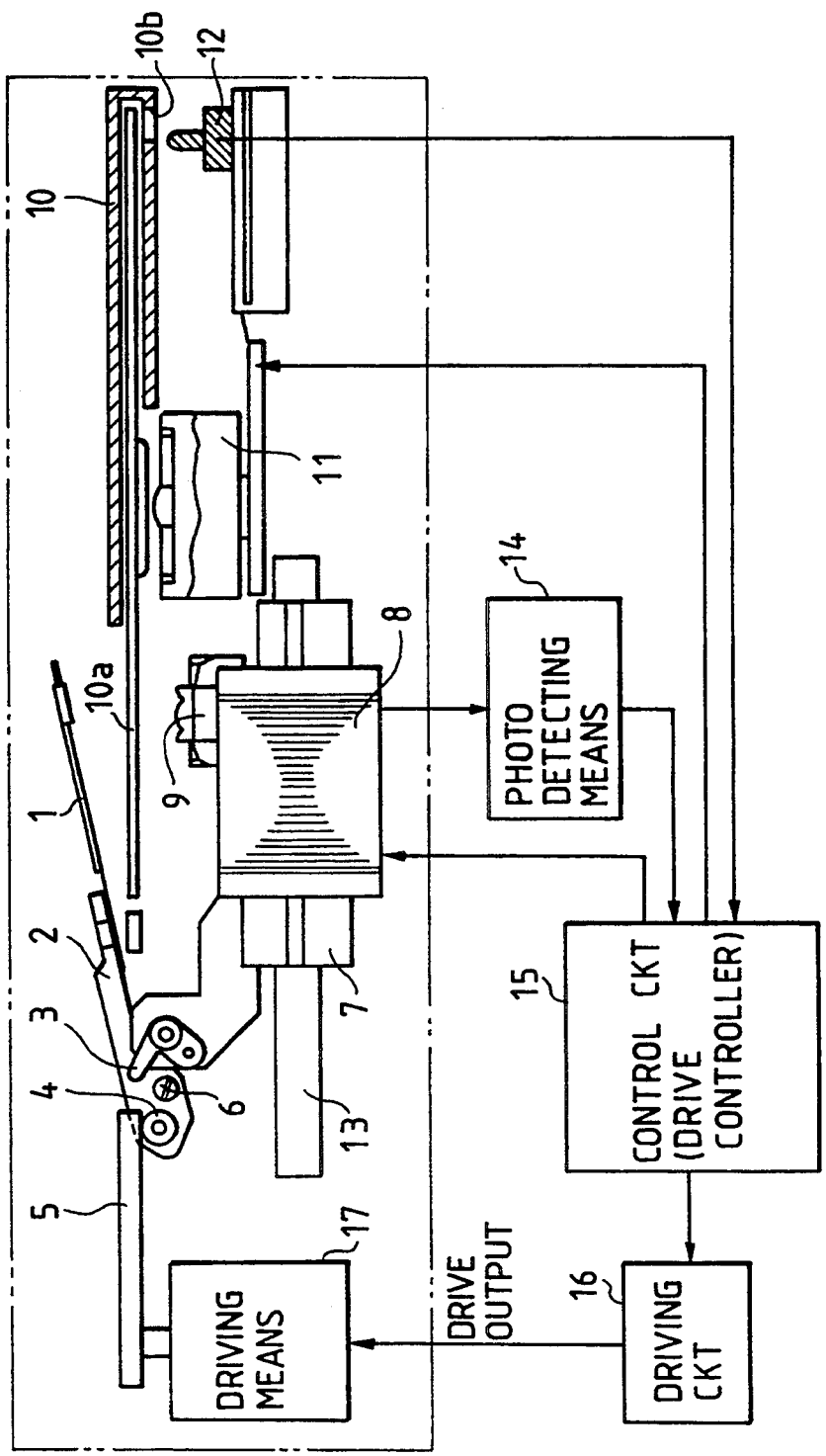
Figure 5:
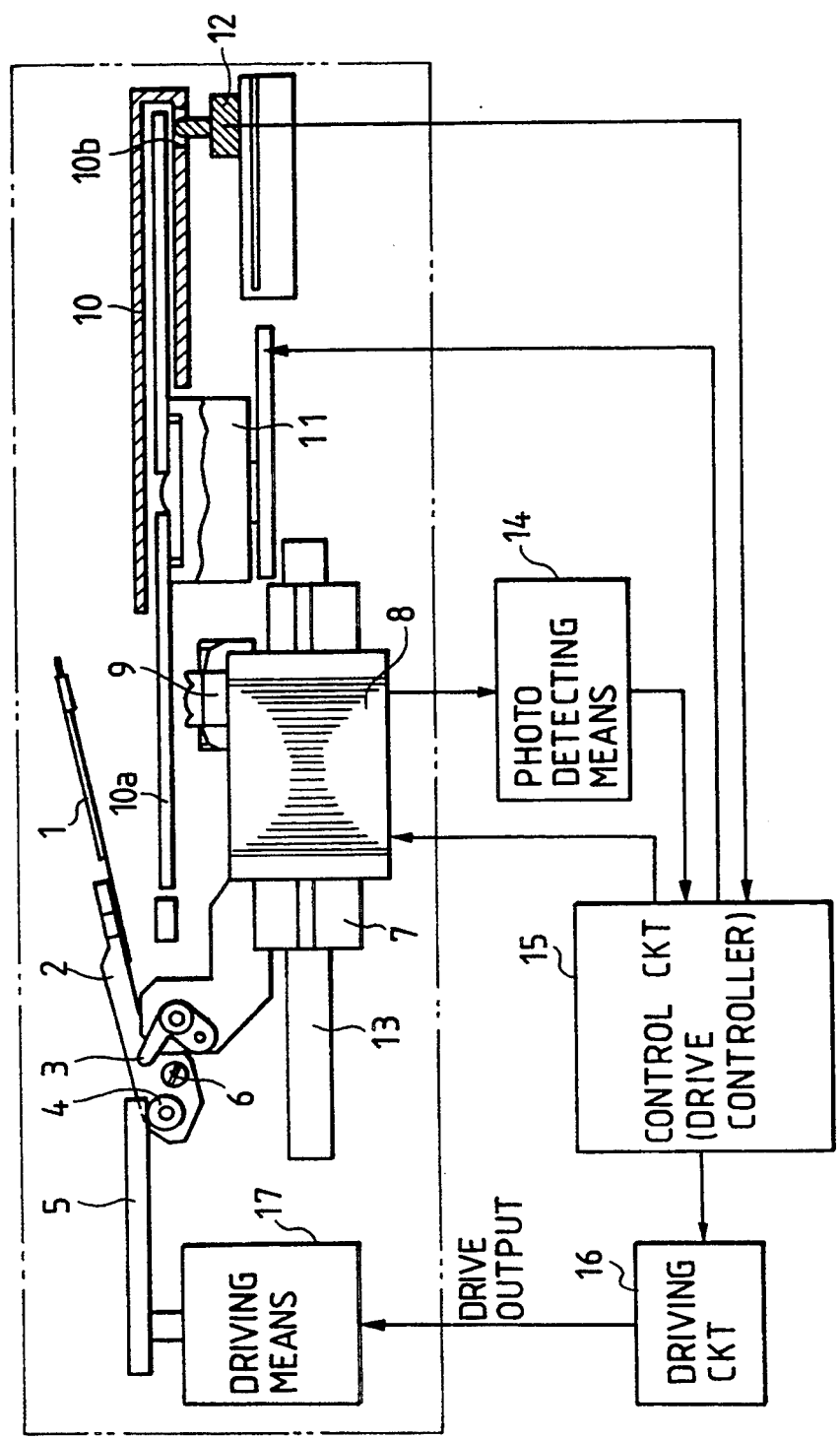
Figure 6:
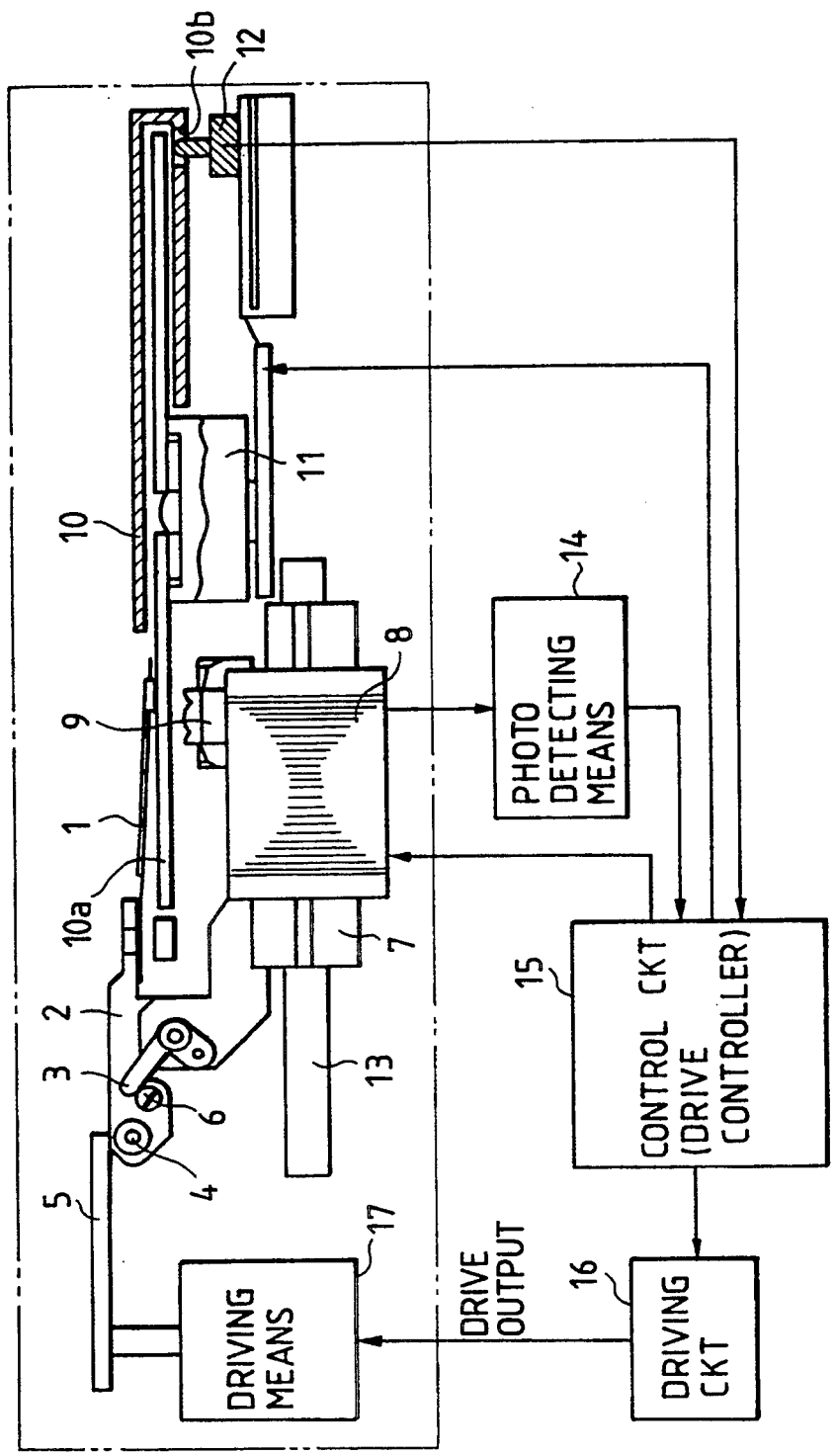

FIGS. 3 to 7 show an embodiment of a drive apparatus to which a magneto-optical recording/reproducing method of the present invention is applied. The drive apparatus comprises a flying magnetic head 1 for applying a modulated magnetic field, a holding member 2 for holding the flying magnetic head, a positioning member 3 for regulating the loading position of the flying magnetic head to a magneto-optical disk, a bearing 4 for holding the flying magnetic head 1 in an unload state, and allowing a seek operation of the holding member 2, a guide shaft 5 for guiding the bearing in the seek direction, a stopper 6 for positioning the holding member 2 by abutting it against the positioning member 3, an optical head 7 for radiating a laser beam onto the recording surface of the magneto-optical disk, and receiving light reflected by the recording surface so as to record/reproduce information, a linear motor coil 8 for seeking the optical head 7 in the radial direction of the disk, an actuator 9 for focusing the laser beam radiated from the optical head 7 onto the recording surface of the magneto-optical disk, and moving the laser beam in the tracking direction, and a disk cartridge 10 for protecting and storing the magneto-optical disk (10a). A write protect switch 10b which slides in a groove is provided to the disk cartridge.

The drive apparatus also comprises a spindle motor 11 for rotating the magneto-optical disk 10a, a write protect detection means 12 for mechanically detecting the position of the groove of the write protect switch 10b provided to the disk cartridge 10, a guide rail 13 for guiding the optical head 7 in the seek direction, an optical detection means 14 for receiving and photoelectrically converting an information signal based on the laser beam from the optical head 7, and a control circuit 15 for controlling a drive circuit 16. The drive circuit 16 drives a drive means 17 on the basis of signals from the optical detection means 14 and the write protect switch 10b so as to drive the linear motor 8 and the actuator 9 and to move the guide shaft 5 vertically.

With this arrangement, when information is recorded/reproduced on/from the magneto-optical disk, as shown in FIG. 3, the disk cartridge 10 is loaded (a state in FIG. 4 to a state in FIG. 5), and the spindle motor 11 is started. Subsequently, auto-focus servo control and auto-tracking servo control are executed by the actuator 9 mounted on the optical head 7. Then, the linear motor is driven to access the optical head 7 to a control track on the magneto-optical disk. Disk information is read to discriminate whether the loaded disk is a magnetic field modulation magneto-optical disk (disk or medium A) or an optical modulation magneto-optical disk (disk or medium B). If the medium B is detected, a standby state is set, and the startup operation of the drive apparatus ends. However, if the medium A is detected, the write protect switch 10b of the disk cartridge 10 is checked. If a write protect mode is ON, as shown in FIG. 7, the write protect switch 10b is detected by the write protect detection means 12, and the flying magnetic head 1 is not landed on the magneto-optical disk 10a on the basis of the detection result. Instead, a standby state is set without changing the state in FIG. 7, and the startup operation of the drive apparatus ends. However, when the write protect switch 10b is OFF, it is detected by the write protect detection means 12 in a state shown in FIG. 5, and the auto-focus servo control and auto-tracking servo control are disabled. Immediately thereafter, the drive means 17 is driven by the drive circuit 16 to land the flying magnetic head 1 on the recording surface of the magneto-optical disk 10a, thus attaining a state shown in FIG. 6. Furthermore, upon completion of landing, when the auto-focus servo control and the auto-tracking servo control are enabled again, the drive apparatus is set in a standby state, and the startup operation of the drive apparatus ends. Note that a series of operations described above are performed by the control circuit 15, needless to say.

According to the present invention, as described above, immediately before the flying magnetic head lands on the magneto-optical disk, the auto-focus servo control and the auto-tracking servo control are temporarily disabled, and are enabled again after landing, thus providing the following effects.

1) Upon landing of the flying magnetic head, a failure of the auto-focus servo control and the auto-tracking servo control can be avoided. Therefore, a large deviation of the optical head from the target track, and an access operation for returning the optical head to the target track upon servo control failure can be omitted.

2) Since servo control failure can be avoided, the startup time of the drive apparatus can be stabilized.

3) An excessive current caused by a large disturbance to the servo control upon landing of the flying magnetic head can be prevented from being supplied to the actuator.

4) Wasteful power consumption can be suppressed.

What is claimed is:

1. A magneto-optical recording/reproducing method for recording information on a magneto-optical disk by radiating a laser beam from an optical head onto the magneto-optical disk, and applying a magnetic field modulated according to information from a flying magnetic head, comprising the steps of:

loading said flying magnetic head onto a disk surface; and inhibiting servo control of said optical head during execution of the loading step.

2. A method according to claim 1, wherein the servo control is focusing servo control.

3. A method according to claim 1 wherein the servo control is tracking servo control.

* * * * *